INVENTORS
JOSEPH A. MILLER
FRANK A. KRUGLINSKI
BY
*Sumelson & Jacob*
ATTORNEYS

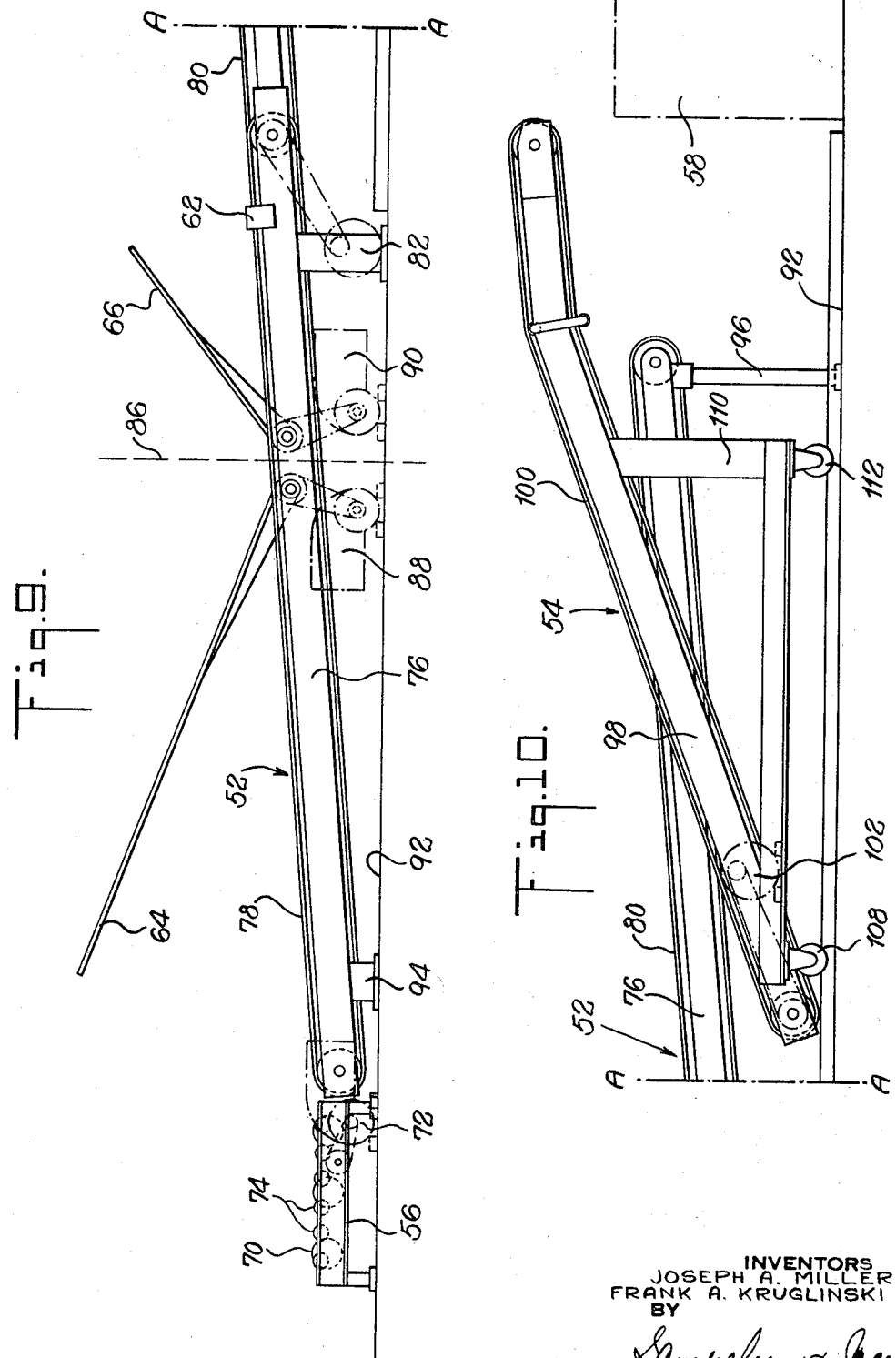

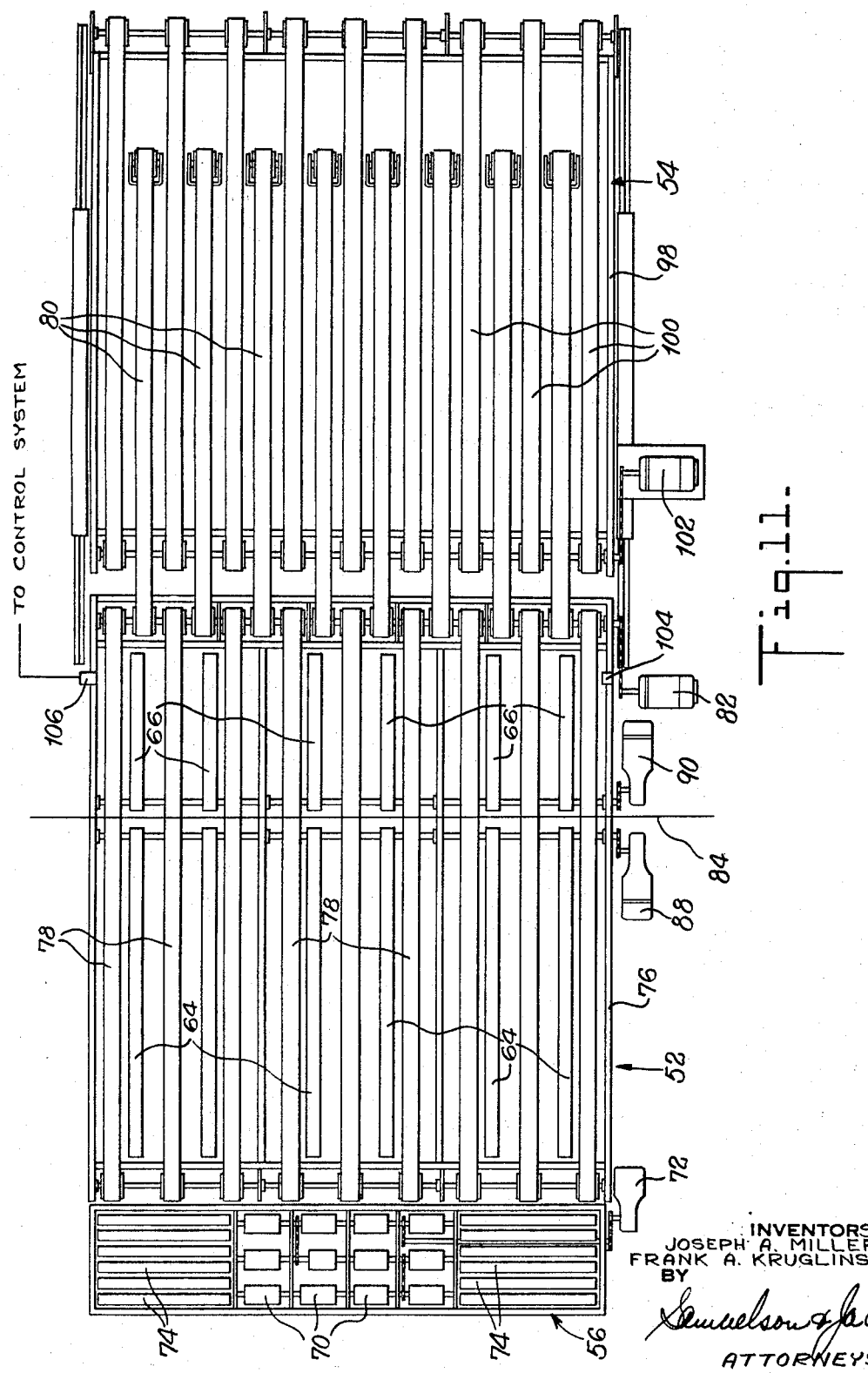

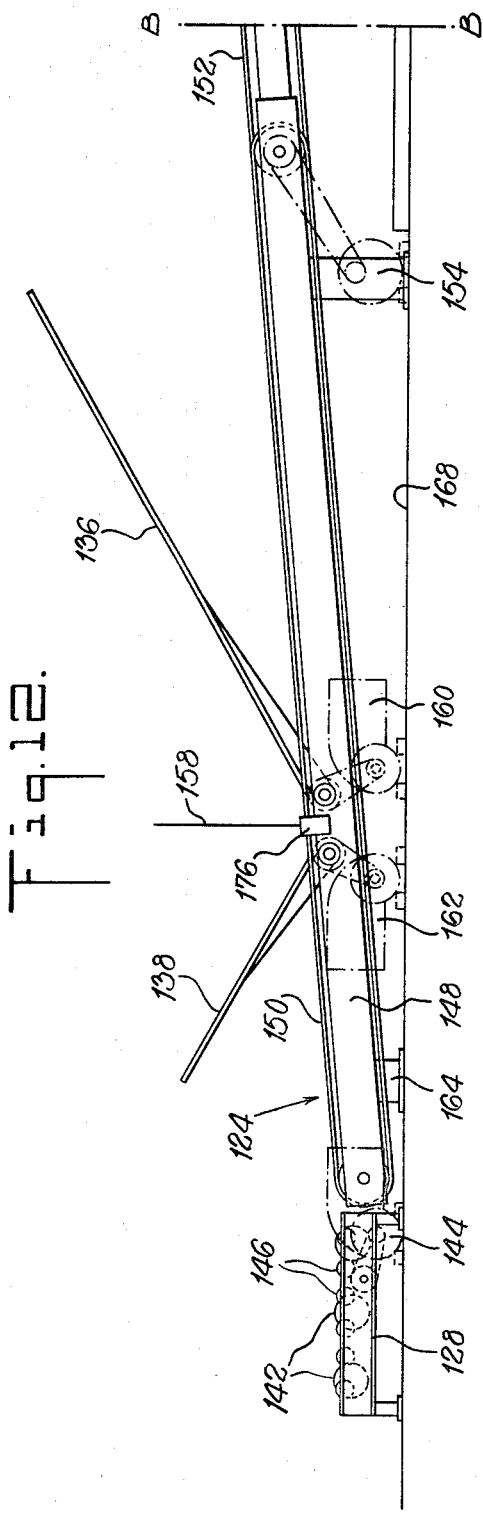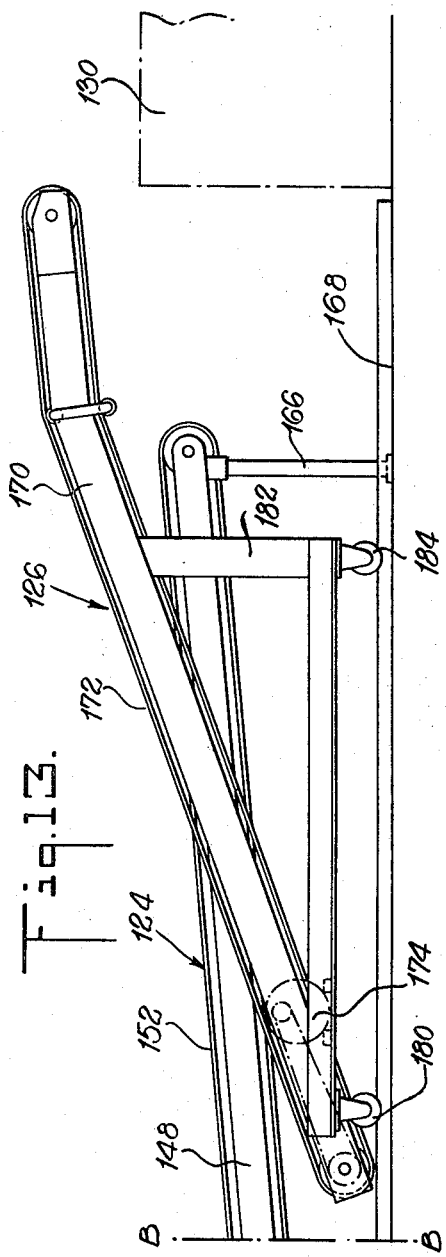

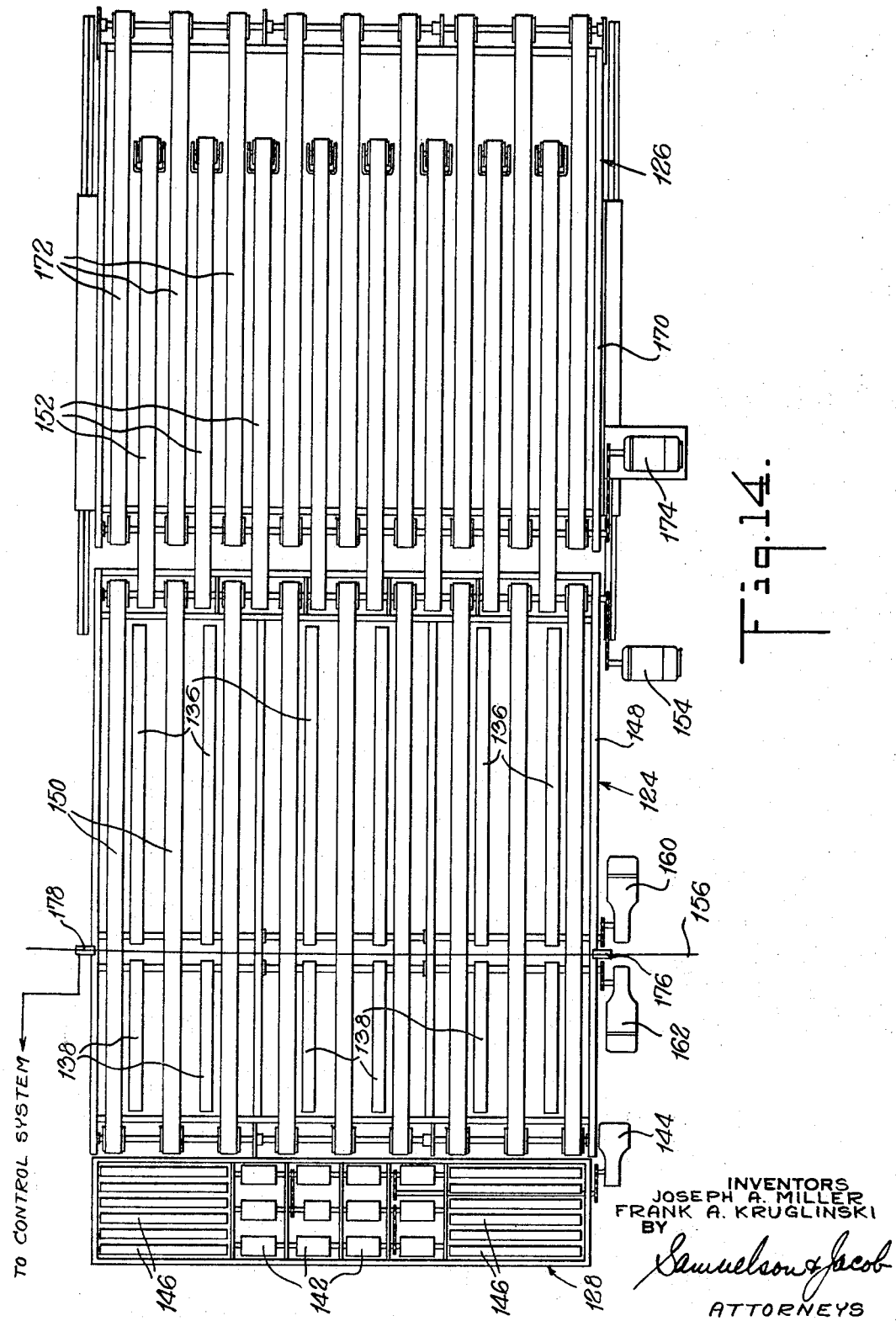

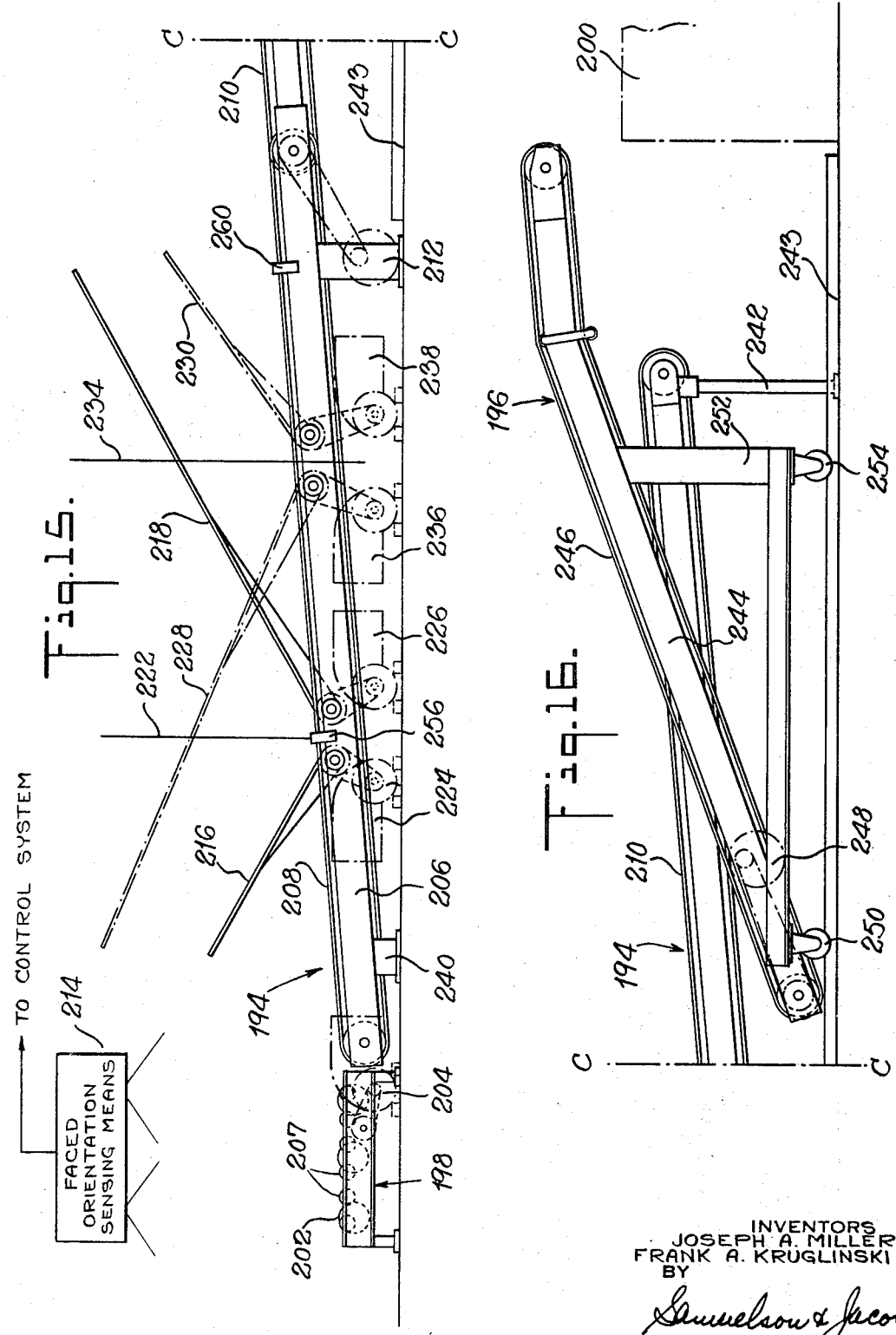

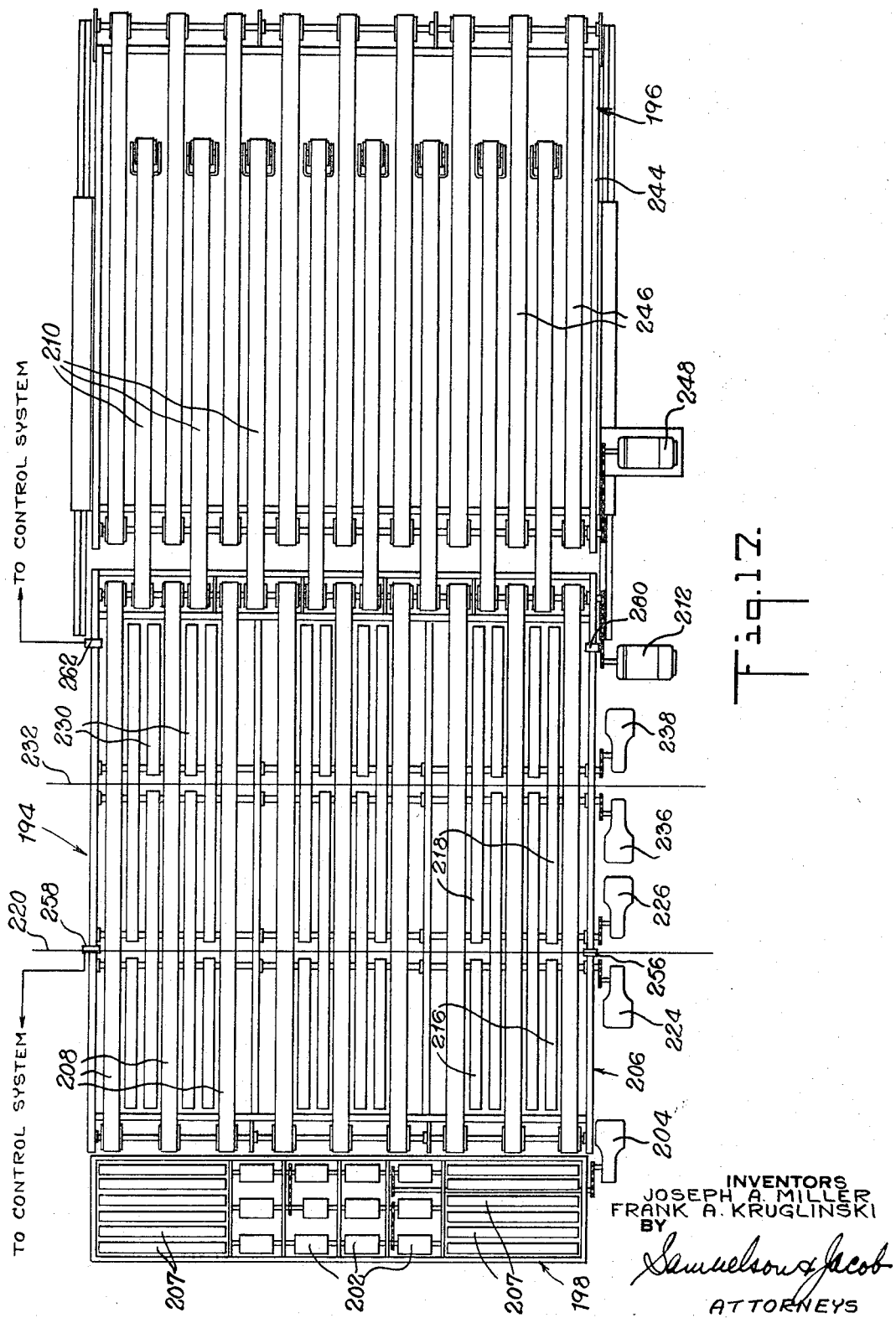

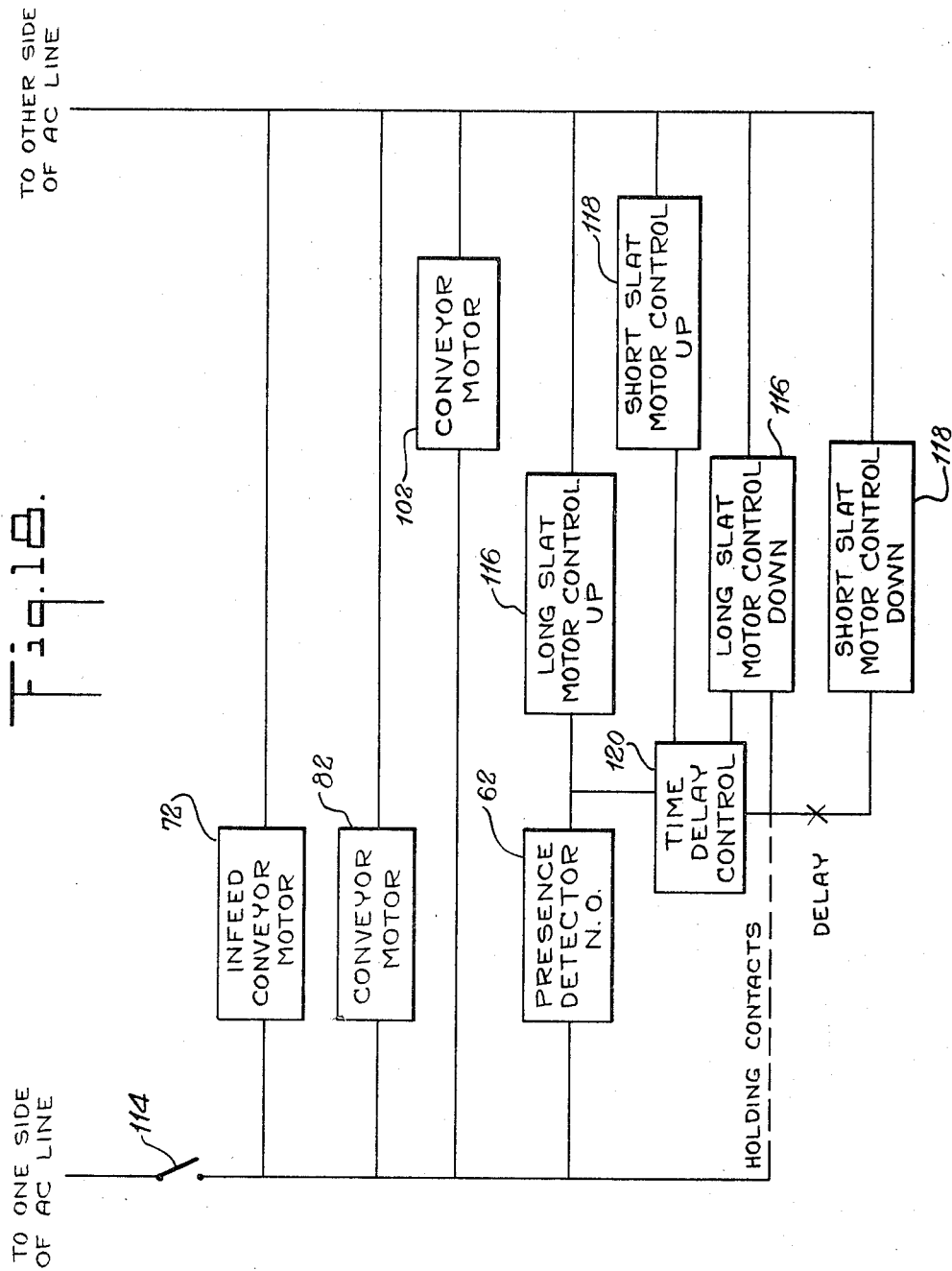

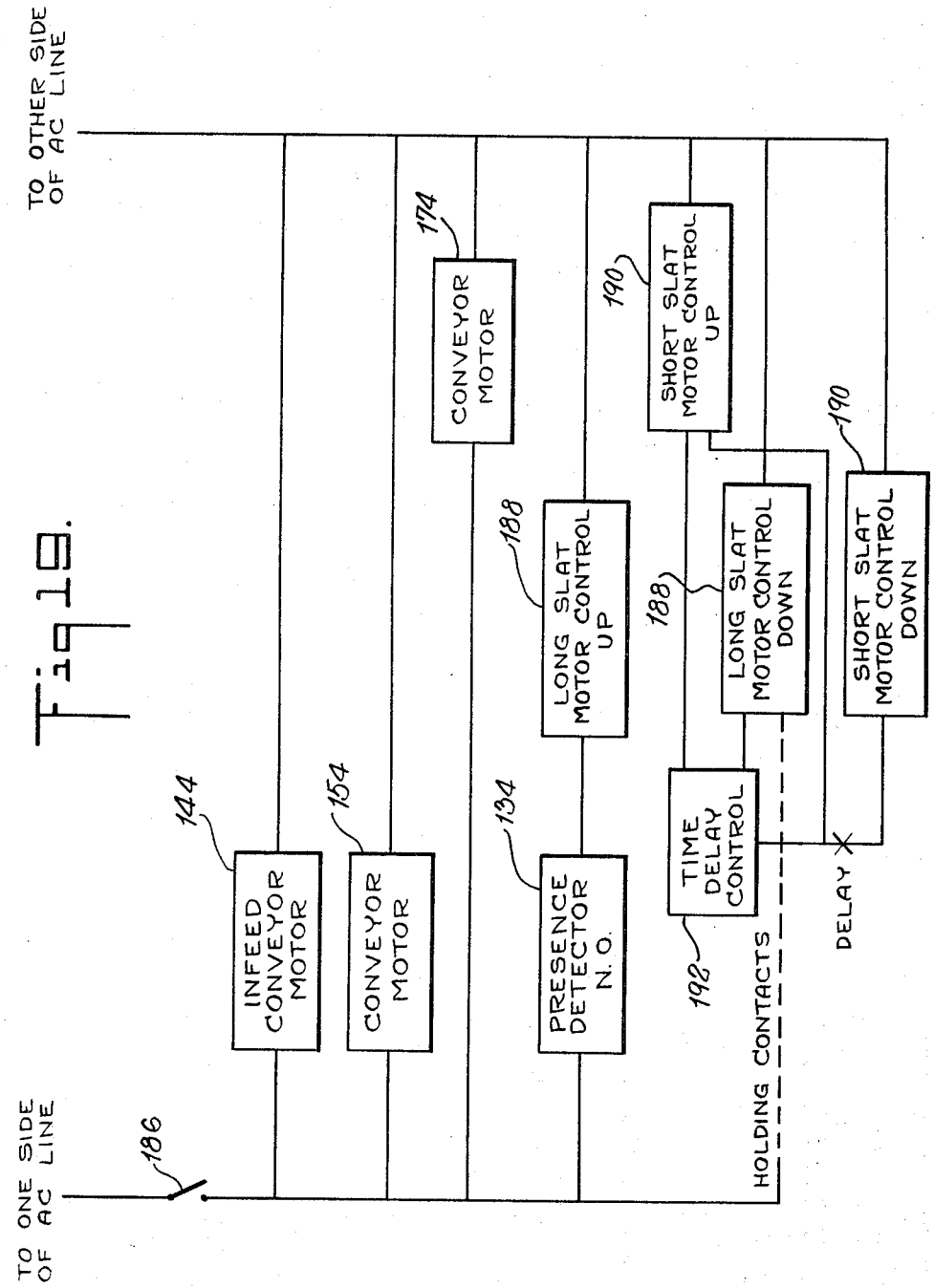

United States Patent Office

3,422,969
Patented Jan. 21, 1969

3,422,969
APPARATUS FOR ORIENTING CASE BLANKS

Joseph A. Miller, Englewood, and Frank A. Kruglinski, North Bergen, N.J., assignors to General Corrugated Machinery Co., Inc., Palisades Park, N.J., a corporation of New Jersey
Filed Aug. 18, 1966, Ser. No. 573,336
U.S. Cl. 214—6                    9 Claims
Int. Cl. B65g 65/03, 59/06

The invention relates to apparatus for orienting case blanks and in particular to such apparatus in which case blanks from a vertical stack delivered from a printer-slotter are automatically oriented and delivered in bundles for feeding to automatic folders.

An important step in the manufacture of corrugated paper cases or boxes is the making of the manufacturer's joint. This is accomplished by folding the two end panels of the case blank toward center and joining them in a joining machine with a piece of gummed tape, glue or other adhesive, or wire stitches. For a long time production speeds in this aspect of case making were limited by the ability of the operator who folded the panels manually and fed the folded blank into the box joining machine. To increase output, automatic folder-feeders were introduced to fold and feed the box blanks into the joining machine. Thus far, it has been necessary for the hoppers of the folder-feeders to be loaded manually. At low speeds and with small case blanks, one man is able to load the hopper of the folder-feeder. At greater speeds or with larger case blanks, two men are needed to keep the hopper full as blanks are added to it continuously, one handful at a time. This is laborious and exhausting work as it involves the manual handling of tons of case blanks each hour.

Thus, it can be seen that there is a need to automatically load the hopper of the folder-feeder and to keep it loaded. Such automatic operation will eliminate the need of some or all of the manpower used for loading while the machine is running. This saving is reflected in additional saving in man-hours which presently is nonproductive due to the fact that part of the crew must wait while the operator is preparing for the next run, a procedure commonly referred to as "set-up" or "make ready." For the foregoing reason, automatic folder-feeders are principally used for runs in large quantities in order to benefit from the reduction of the number of man-hours expended for "set-up."

Accordingly, it is an important object of the invention to provide apparatus for automatically loading the hopper of a folder-feeder.

It is a further object of the invention to proivde such apparatus which can be used to feed small quantities of case blanks to the hopper of a folder-feeder. Use of the apparatus of the invention permits the operator to perform his make ready while the vertical stacks of case blanks are positioned on the input end of the apparatus of the invention.

Since case blanks from the printer-slotter may be delivered to the apparatus in either faced orientation (printed side up or down) and since some automatic folder-feeders fold upward and others fold downward, it is necessary to orient the sheets as required. Accordingly, it is a still further object of the invention to provide apparatus which will shingle the sheets from a vertical stack and deliver them in the desired faced orientation to the hopper of an automatic folder-feeder.

It is a still further object of the invention to provide such a device which is economical to manufacture and easy to operate.

These and other objects, advantages, features and uses will be apparent during the course of the following description when taken in conjunction with the accompanying drawings wherein.

Figure 20:
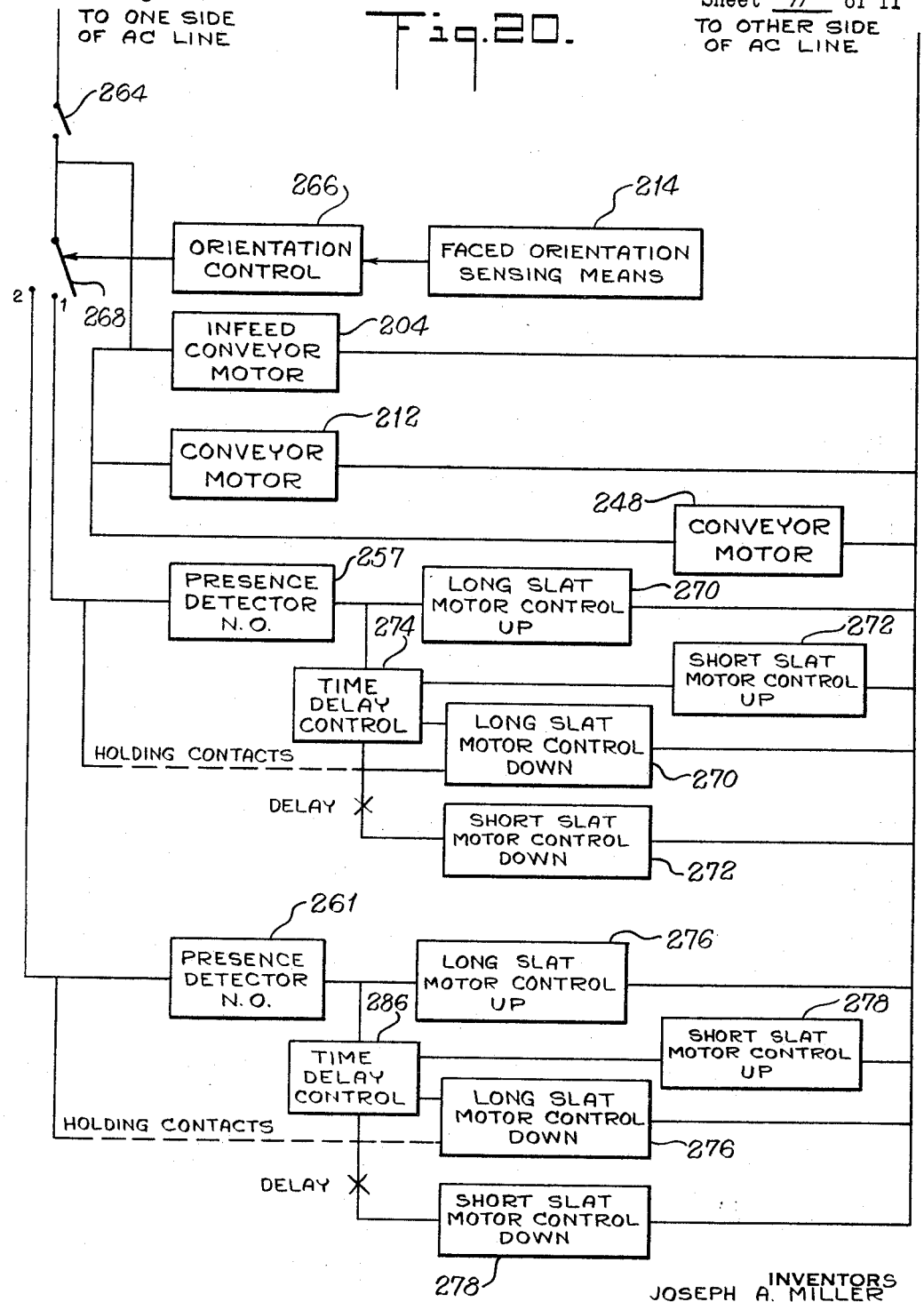

FIGURES 9 and 10, joined along the lines A—A, together constitute a side elevational view of a preferred form of apparatus of the invention for delivering case blanks at its output in the same faced orientation which they had in the incoming vertical stack;

FIGURE 11 is a top plan view of the apparatus of FIGURES 9 and 10;

FIGURES 12 and 13, joined along lines B—B, together constitute a side elevational view of a preferred form of apparatus of the invention for delivering case blanks at its output in the reverse faced orientation from that which they had in the incoming vertical stack;

FIGURE 14 is a top plan view of the apparatus of FIGURES 12 and 13;

FIGURES 15 and 16, joined on the lines C—C, together constitute a side elevational view of a preferred form of apparatus of the invention for delivering case blanks at its output in either faced orientation;

FIGURE 17 is a top plan view of the apparatus of FIGURES 15 and 16;

FIGURE 18 is a block diagram of the electrical control system used with the embodiment of FIGURES 9–11;

FIGURE 19 is a block diagram of the electrical control system used with the embodiment of FIGURES 12–14; and FIGURE 20 is a block diagram of the electrical control system used with the embodiment of FIGURES 15–17.

In the drawings, wherein, for the purpose of illustration, are shown preferred embodiments of the apparatus of the invention, the numeral 50 generally designates apparatus of the invention for delivering case blanks at the output of the machine in the same faced orientation as they had in the vertical stack delivered to the input of the apparatus.

FIGURES 1–4 are diagrammatic views of apparatus 50 in operation wherein apparatus 50 is seen to comprise conveyors 52 and 54, infeed conveyor 56 and output hopper 58. A vertical stack of case blanks 60 is delivered from a printer-slotter or other processing system by automatic or manual means to infeed conveyor 56. The stack 60 moves along conveyor 52 until its presence opposite sensing means 62 is detected. Sensing means 62 may be a photoelectric cell system or one or more limit switches suitably mounted in the path of the vertical stacks of case blanks.

When the stack 60 is sensed by sensing means 62, long slats 64 are brought up from the conveyor (structural details to be described later) so as to make contact with the rear of stack 60. Now, the conveyor 52 is stopped and short slats 66 are brought up from the conveyor to support the bottom of stack 60. Since stacks of case blanks of various sizes may be handled by the apparatus of the invention, the long slats are made slightly longer than the height of the tallest vertical stack to be processed through the apparatus and the short slats are made long enough to properly support the vertical stack of case blanks. The length of the case blank is defined for the purpose of this application as the dimension of the side of the case blank which is parallel to the direction of longitudinal movement of the conveyors.

Now, long slats 64 are moved down and toward the rear and short slats 66 are moved down into the conveyor 52. This places the case blanks 68 in the shingled attitude of FIGURE 3 and conveyor 52 is restarted to cause the case blanks to run along the conveyors 52 and 54 for individual delivery to hopper 58.

Next, long slats 64 drop all the way down within conveyor 52 to prepare the apparatus for the next vertical stack 60. At the same time, the individual case blanks 68 continue to feed into hopper 58 from which they are automatically withdrawn and processed by the machine being fed by the apparatus of the invention.

FIGURES 9, 10, 11 and 18 illustrate in detail the apparatus whose general operation has just been described in connection with the illustrations of FIGURES 1–4. Infeed conveyor 56 preferably comprises a plurality of drive rollers 70 which are driven by motor 72 and the shafts, chains and sprockets shown in FIGURE 11. For the sake of economy, idler rollers 74 are mounted on each side of the drive rollers as shown in FIGURE 11 but if it is desired to drive the incoming stacks across the full width of the machine, drive rollers may be substituted for the idler rollers. Several stacks of case blanks may be handled simultaneously by the apparatus so long as at least a portion of each stack overlies some drive rollers 70 so that the stack is positively moved onto conveyor 52.

Conveyor 52 comprises frame 76, longitudinal moving means 78 and 80 (preferably laterally spaced belts) and motor 82 which drives belts 78 and 80 by means of the chain, sprocket and shaft shown in FIGURES 9 and 11. Long, pivotable slats 64 are laterally spaced and mounted between belts 78 and are connected so that they are pivoted with respect to lateral line 84 in lateral plane 86 by motor 88 and the chain, shaft and sprocket shown in FIGURES 9 and 11. Lateral line 84 and lateral plane 86 are normal to the direction of motion of the moving belts.

Short slats 66, which are also laterally spaced and mounted between belts 78, are pivoted with respect to lateral line 84 by motor 90 and the chain, sprocket and shaft illustrated in FIGURE 11. Conveyor 52 is mounted on legs 94 and 96 which rest on floor 92. Since legs 96 are longer than legs 94, conveyor 52 is inclined upward from its input. This results in more controlled movement of the stack and the shingled case blanks through the apparatus of the invention.

Conveyor 54 comprises frame 98, laterally spaced, longitudinal, moving means 100 (preferably belts) which are caused to move by motor 102, and the chain, sprocket and shaft shown in FIGURE 11. Light source 104 and photocell 106 together constitute presence sensing means 62 and together detect the presence of a vertical stack of case blanks. Photocell 106 is connected in a manner well-known in the art, to the control system so that work may be carried out on the vertical stack.

Conveyor 54 is mounted on rollers 108 and legs 110 to the end of which are attached rollers 112. The upward slant of conveyor 54 is greater than that of conveyor 52 which improves the movement of the case blanks through the apparatus. The conveyor 54 may be moved on its rollers with respect to conveyor 52 and hopper 58 to achieve the best operating relationship based on the size of the case blanks and the position of the hopper 58.

FIGURE 18 is a simplified, schematic block diagram of the electrical control system of the apparatus of FIGURES 9–11. When main switch 114 is closed, voltage is applied to motors 72, 82 and 102 so that all the conveyor belts and rollers move. Now, when a stack of case blanks reaches the position at which its presence is detected by sensing means 62, which controls a circuit which is normally open, the control circuit is closed. This stops motor 82 to thereby stop belts 78 and 80 and causes motor control 116, which controls motor 88, to cause motor 88 to operate so as to move long slats 64 up into contact with the rear of vertical stack 60. After a preset time delay accomplished by means of time delay control 120 in a manner well-known in the art, motor control 118, which controls motor 90, causes motor 90 to operate so that short slats 66 are moved upward against the bottom of the stack so as to lift the stack off belts 78. At this point, holding contacts are closed so as to hold the circuits to controls 116 and 118 closed. This may be accomplished in any manner well-known in the art.

After a further delay to permit slats 66 to lift the stack off belts 78, control 116 now causes motor 88 to reverse so as to move long slats 64 down. This spreads the stack so that the individual case blanks start to shingle or feather. Now, after a further delay, control 118 causes motor 90 to move short slats 66 down so that the case blanks now rest on the conveyor belts. Now, motor 82 is restarted and the case blanks move longitudinally through the apparatus toward the output. Long slats 64 continue to move down until they are back to their original positions between belts 78 and the apparatus is ready to receive another vertical stack of case blanks.

FIGURES 5–8 are diagrammatic views of apparatus 122 in operation. Apparatus 122 is intended to deliver case blanks whose faced orientation at the output of the machine is the reverse of that in the vertical stack delivered to the input of the machine. Apparatus 122 is seen to comprise conveyors 124 and 126, infeed conveyor 128 and output hopper 130. Vertical stack 132 of case blanks moves from infeed conveyor 128 onto conveyor 124 until its presence is detected by presence sensing means 134. When its presence at the proper location is detected, the conveyor 124 is stopped and long slats 136 are pivoted into an upright position so that they contact the leading end of stack 132. This helps to align the stack.

Now, short slats 138 are pivoted upward against the bottom of the stack. Both sets of slats now pivot forward in the direction toward the output end until slats 136 reenter their positions inside the conveyor 124. This causes the case blanks to rest on their edges on the longitudinal moving means of the conveyor in a relatively unstable position. However, as slats 138 continue to move forward, this unstable condition does not exist for long and the case blanks 140 are pushed onto conveyor 124 in a faced orientation reversed from that which they had in the original stack. Slats 138 are now moved back into the conveyor to prepare for the next stack.

The conveyor 124 is started and case blanks 140 proceed along conveyors 124 and 126 in a shingled or feathered attitude to be delivered to hopper 130 from which they will automatically feed into a box joining machine for further processing by a folder-feeder or other equipment.

Long slats 136 are longer than the vertical stack of case blanks and short slats 138 are long enough to support the case blanks. The length of the case blank is defined as the length of the edge parallel to the longitudinal dimension of apparatus 122.

FIGURES 12, 13, 14 and 19 illustrate in detail the apparatus whose general operation has just been described in connection with the illustrations of FIGURES 5–8. Infeed conveyor 128 preferably comprises a plurality of drive rollers 142 which are driven by motor 144 and the shafts, chains and sprockets illustrated in FIGURE 14. For the sake of economy, idler rollers 146 are mounted on each side of the drive rollers as shown in FIGURE 14 but if it is desired to drive the incoming stacks across the full width of the machine, drive rollers may be substituted for the idler rollers. Several stacks of case blanks may be handled simultaneously by the apparatus so long as at least a portion of each stack overlies some drive rollers 142 so that the stack is positively moved onto conveyor 124.

Conveyor 124 comprises frame 148, longitudinal moving means 150 and 152 (preferably laterally spaced belts) and motor 154 which drives belts 150 and 152 by means of the shaft, sprocket and chain shown in FIGURES 12 and 14. Long, pivotable slats 136 are laterally spaced and mounted between belts 150 and are connected so that they are pivoted with respect to lateral line 156 in lateral plane 158 by motor 160 and the chain, shaft and sprocket shown in FIGURES 12 and 14. Lateral line 156 and lateral plane 158 are normal to the direction of motion of the moving belts.

Short slats 138, which are also laterally spaced and mounted between belts 150, are pivoted with respect to lateral line 156 by motor 162 and the chain, sprocket and shaft illustrated in FIGURE 14. Conveyor 124 is mounted on legs 164 and 166 which rest on floor 168. Since legs 166 are longer than legs 164, conveyor 124 is inclined upward from its input. This results in more controlled movement of the stack and the shingled case blanks through the apparatus of the invention.

Conveyor 126 comprises frame 170, laterally spaced, longitudinal, moving means 172 (preferably belts) which are caused to move by motor 174, and the chain, sprocket and shaft shown in FIGURE 14. Light source 176 and photocell 178 together constitute presence sensing means 134 and together detect the presence of a vertical stack of case blanks. Photocell 178 is connected, in a manner well-known in the art, to the control system so that work may be carried out on the vertical stack.

Conveyor 126 is mounted on rollers 180 and legs 182 to the end of which are attached rollers 184. The upward slant of conveyor 126 is greater than that of conveyor 124 which improves the movement of the case blanks through the apparatus. The conveyor 126 may be moved on its rollers with respect to conveyor 124 and hopper 130 to achieve the best operating relationship based on the size of the case blanks and the position of hopper 130.

FIGURE 19 is a simplified, schematic, block diagram of the electrical control system of the apparatus of FIGURES 12–14. When main switch 186 is closed, voltage is applied to motors 144, 154 and 174 so that all the conveyor belts and rollers move. Now, when a stack of case blanks reaches the position at which its presence is detected by presence sensing means 134, which controls a circuit which is normally open, the control circuit is closed. This stops motor 154 thereby stopping belts 150 and 152 and causes motor control 188 which controls motor 160 to move long slats 136 up into contact with the front of vertical stack 132. After a preset time delay, accomplished by means of time delay control 192 in a manner well-known in the art, motor control 190, which controls motor 162, causes motor 162 to operate so that short slats 138 are moved upward against the bottom of the stack.

Now, control 188 reverses the direction of operation of motor 160 so that slats 136 move down into their positions between belts 150. At the same time, motor control 190 continues to cause motor 162 to move slats 138 up and in the same pivoted direction as slats 136. Before the stack passes the position at which the light beam path between light source 176 and photocell 178 is no longer interrupted, holding contacts, which operate in a manner well-known in the art, are closed. Motor 162 continues to pivot short slats 138 toward the output end of the apparatus until a position is reached at which the case blanks 140 are tilted forward so that they are delivered to the output in a reverse faced orientation from that which they had at the input. Now, motor 154 is restarted so that belts 150 and 152 start to move the case blanks toward the output.

Figure 1:
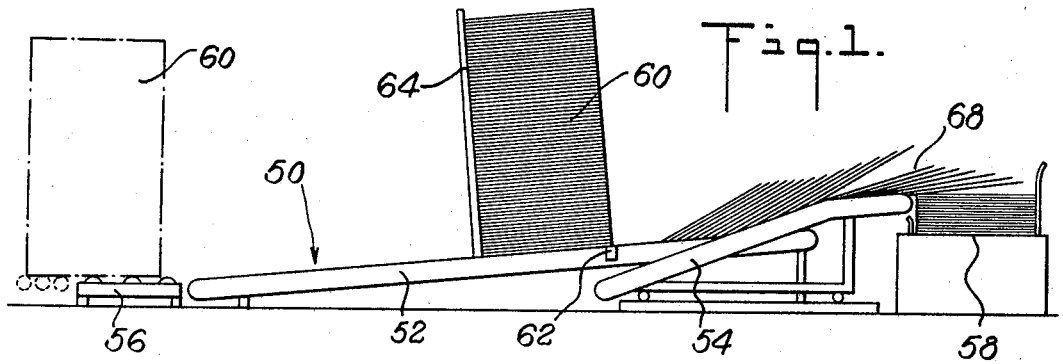
FIGURES 1–4 are diagrammatic, elevational views showing the progression of the case blanks through apparatus of the invention while delivering the case blanks to the output hopper in the same faced orientation as they had in the incoming vertical stack.
Figure 2:
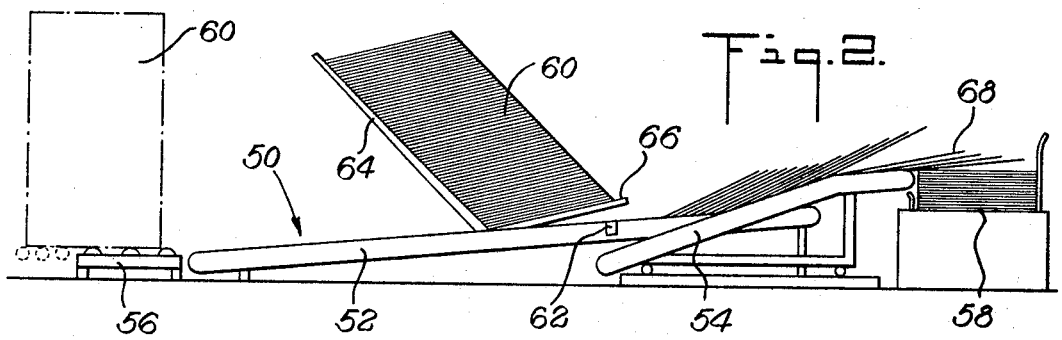
Figure 3:
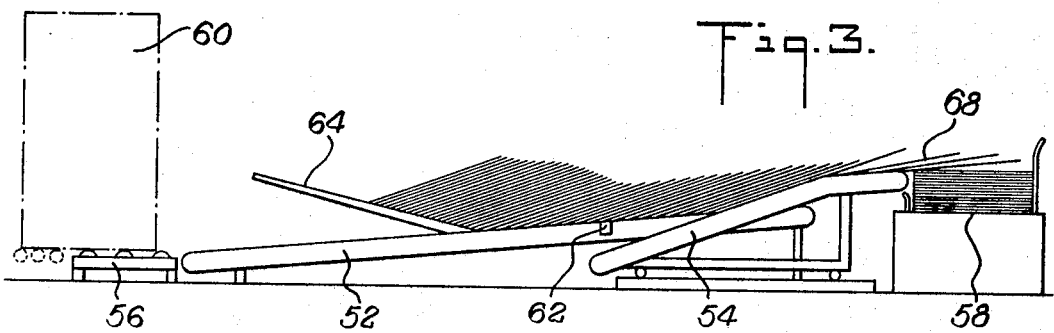
Figure 4:
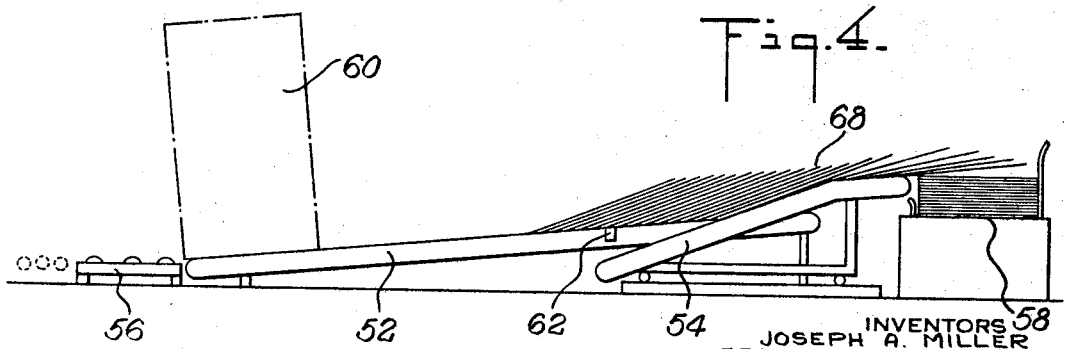
Figure 5:
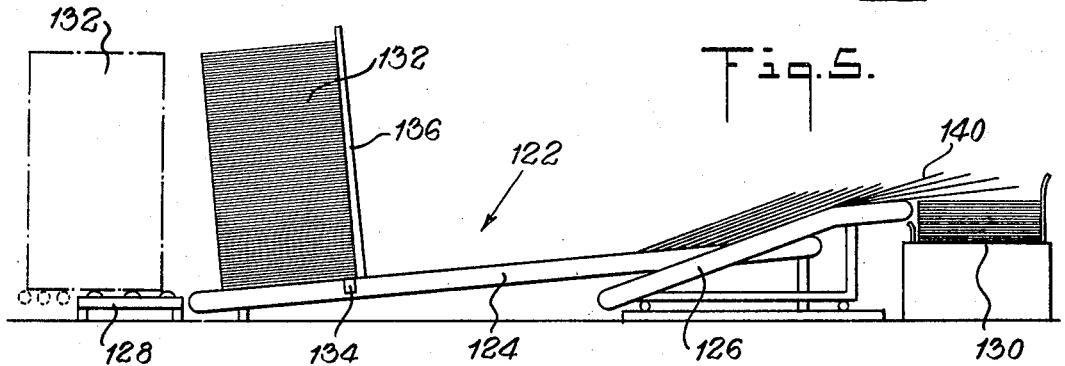
FIGURES 5–8 are views similar to FIGURES 1–4 wherein the case blanks are delivered to the output hopper in a faced orientation which is the reverse of that which they had in the incoming vertical stack.
Figure 6:
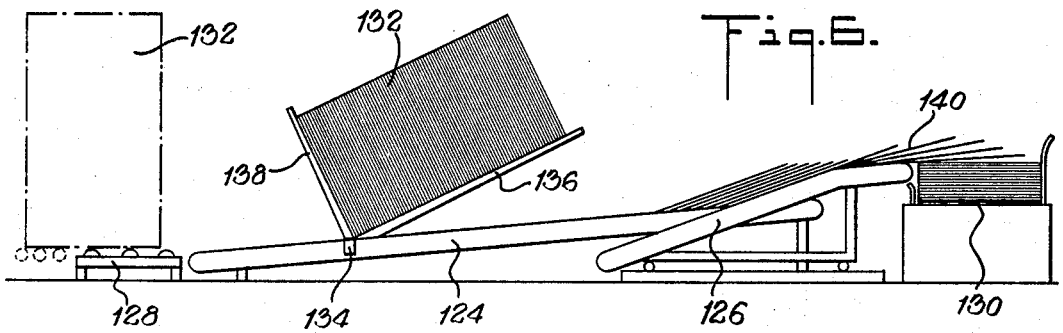
Figure 7:
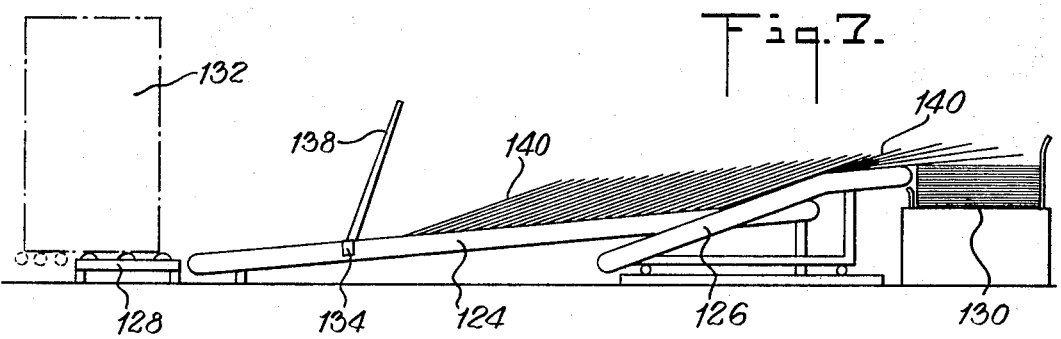
Figure 8:
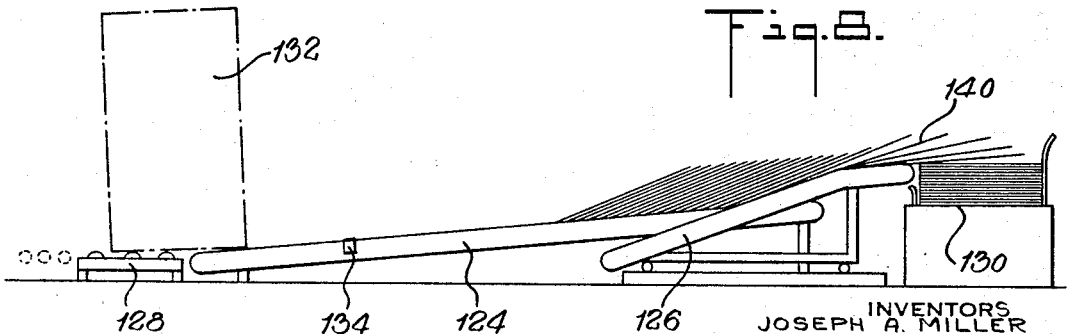

Due to the urging of short slats 138 and the domino effect, the faced orientation of the blanks in the whole stack are reversed as shown in FIGURE 7. After a further time delay, motor control 190 reverses motor 162 and the slats 138 are moved back into positions between belts 150 and the apparatus is ready to receive another vertical stack of case blanks.

FIGURES 15, 16, 17 and 20 illustrate in detail apparatus which combines the characteristics of both the systems illustrated in FIGURES 1–4 and 5–8. The apparatus is seen to comprise conveyors 194 and 196, infeed conveyor 198 and hopper 200. Infeed conveyor 198 comprises drive rollers 202, motor 204 and idler rollers 207. Motor 204 drives rollers 202 through the shafts, chains and sprockets illustrated in FIGURE 17. For the sake of economy, idler rollers 207 are mounted on each side of the drive rollers as shown in FIGURE 17 but if it is desired to drive the incoming stack across the full width of the machine, drive rollers may be substituted for the idler rollers. Several stacks of case blanks may be handled simultaneously by the apparatus so long as at least a portion of each stack overlies some driven rollers 202 so that it is positively moved onto conveyor 194. Also, all the stacks which enter upon infeed conveyor 198 at the same time should be of the same faced orientation.

Conveyor 194 comprises frame 206, longitudinal moving means 208 and 210 (preferably laterally spaced belts) and motor 212 which drives belts 208 and 210 by means of the shaft, sprocket and chain shown in FIGURES 15 and 17. The faced orientation of the top case blank on the vertical stacks entering onto infeed conveyor 198 is measured by faced orientation sensing means 214.

Sensing means 214 is of the type which detects whether or not the face of the case blank being scanned is blank or contains printing thereon. The sensing means 214 are preset so that case blanks of the proper faced orientation are delivered to hopper 200. For example, if it is set for "printed side up," sensing means 214 will actuate the controls to deliver "printed side up" blanks in the same orientation in which they are delivered to the input of the apparatus. Similarly, it will actuate the controls to reverse the faced orientation of case blanks which are delivered to the apparatus "printed side down." The system will also operate in the same manner to deliver case blanks to the hopper "printed side down."

Short slats 216 and long slats 218 are pivoted with respect to lateral line 220 in lateral plane 222. Motor 224 moves slats 216 and motor 226 moves slats 218 in conjunction with the shafts, chains and sprockets illustrated in FIGURES 15 and 17. Slats 216 and 218 are laterally spaced among belts 208. Slats 216 and 218 serve to reverse the faced orientation of case blanks on which they act.

Long slats 228 and short slats 230 are laterally spaced among belts 208 and are pivoted with respect to lateral line 232 in lateral plane 234. Motor 236 moves slats 228 and motor 238 moves slats 230 in conjunction with the shafts, chains and sprockets illustrated in FIGURES 15 and 17.

Lateral lines 220 and 232 and lateral planes 222 and 234 are normal to the direction of motion of the moving belts.

Conveyor 194 is mounted on legs 240 and 242 which rest on floor 243. Since legs 242 are longer than legs 240, conveyor 194 is inclined upward from its input. This results in more controlled movement of the stack and the shingled case blanks through the apparatus of the invention.

Conveyor 196 comprises frame 244, laterally spaced, longitudinal, moving means 246 (preferably belts) which are caused to move by motor 248, and the chain, sprocket and shaft illustrated in FIGURES 15 and 17. Conveyor 196 is mounted on rollers 250 and legs 252 to the end of which are attached rollers 254. The upward slant of conveyor 196 is greater than that of conveyor 194 which improves the movement of the case blanks through the apparatus. The conveyor 196 may be moved on its rollers with respect to conveyor 194 and hopper 200 to achieve the best operating relationship based on the size of the case blanks and the position of hopper 200.

Light source 256 and photocell 258 together constitute presence sensing means 257 which is operative when sensing means 214 commands the system to reverse the faced orientation of the case blanks. Light source 260 and photocell 262 together constitute presence sensing means 261 which is operative when sensing means 214 commands the system to deliver the case blanks with their faced orientation unchanged.

FIGURE 20 is a simplified, schematic, block diagram of the electrical control system of the apparatus of FIGURES 15–17. When main switch 264 is closed, voltage is applied to motors 204, 212 and 248 so that all the conveyor belts and rollers move. Now, when a stack of case blanks enters the infeed conveyor, sensing means 214 determines if the case blanks are to be fed through in the same faced orientation or reversed. If it is to be the same, orientation control 266 moves selection switch 268 to position 2 and if it is to be reversed, selection switch 268 is moved to position 1.

When switch 268 is in position 1 and a stack of case blanks interrupts the light beam between light source 256 and photocell 258, the normally open circuit controlled by sensing means 257 is closed. This stops motor 212 to stop belts 208 and 210 and causes motor control 270 which controls motor 226 to move long slats 218 up into contact with the front of the vertical stack. After a preset time delay, accomplished by means of time delay control 274 in a manner well-known in the art, motor control 272, which controls motor 224, causes motor 224 to operate so that short slats 216 are moved upward against the bottom of the stack.

Now, control 270 reverses the direction of motor 226 so that slats 218 move down into their positions between the belts. At the same time, motor control 272 continues to cause motor 224 to move slats 216 up and in the same pivoted direction as slats 218. Before the stack passes the position at which the light beam path between light source 256 and photocell 258 is no longer interrupted, holding contacts are closed. Motor 224 continues to pivot short slats 216 toward the output end of the apparatus until a position is reached at which the case blanks are tilted forward so that they are delivered to the output in a reverse faced orientation from that which they had at the input. Now, motor 212 is started and belts 208 and 210 move the case blanks along the conveyor.

Due to the urging of short slats 216 and the domino effect, the faced orientation of the blanks in the whole stack are reversed. After a further time delay, motor control 272 reverses motor 224 and the slats 216 are moved back into positions between belts 208 and the apparatus is read to receive another vertical stack of case blanks.

When switch 268 is in position 2 and a stack of case blanks interrupts the light beam between light source 260 and photocell 262, the normally open circuit controlled by sensing means 261 is closed. This stops motor 212 to thereby stop belts 208 and 210 and causes motor control 276, which controls motor 236, to cause motor 236 to move long slats 228 up into contact with the rear of the stack. After a preset delay accomplished by means of time delay control 280, motor control 278, which controls motor 238, causes motor 228 to operate so that short slats 230 are moved upward against the bottom of the stack. At this point, the holding contacts close to hold the circuits to controls 276 and 278 closed.

After further delay to permit slats 230 to lift the stack off belts 208, control 276 now causes motor 236 to reverse so as to move long slats 228 down. This spreads the stack so that the individual case blanks start to shingle or feather. Now, after a further delay, motor 212 is started so that belts 208 and 210 move the case blanks along the conveyor and control 278 causes motor 238 to move short slats 230 down so that the case blanks rest on the conveyor belts and start to move longitudinally through the apparatus toward the output. Long slats 228 continue to move down until they are back to their original positions between belts 208 and the apparatus is ready to receive another vertical stack of case blanks.

While the invention has been disclosed in relation to specific examples and embodiments, we do not wish to be limited thereto, for obvious modifications, changes, alterations and adjustments will occur to those skilled in the art without departing from the spirit and scope of the invention.

What is claimed is:
1. Apparatus for orienting case blanks comprising:
a frame;
a plurality of laterally spaced, longitudinal, moving means mounted in the frame to form a longitudinal conveyor having an input end and an output end;
means for moving the plurality of laterally spaced, longitudinal, moving means;
means for feeding a vertical stack of case blanks to the longitudinal conveyor at the input end;
a first plurality of laterally spaced, pivotable slats mounted in the frame between the laterally spaced, longitudinal, moving means, the lengths of at least some of the first plurality of pivotable slats being greater than the height of the vertical stack of case blanks;
a second plurality of laterally spaced, pivotable slats mounted in the frame between the laterally spaced, longitudinal, moving means, the lengths of at least some of the second plurality of pivotable slats being great enough to support the vertical stack of case blanks;
first means for pivoting the first plurality of pivotable slats and second means for pivoting the second plurality of pivotable slats;
both the pluralities of pivotable slats being pivoted with respect to a lateral line in a first lateral plane across the frame;
means for sensing the position of the vertical stack of case blanks with respect to the first lateral plane;
first means for actuating the first pivoting means and second means for actuating the second pivoting means actuated by the sensing means when one vertical end of the vertical stack of case blanks is at a predetermined position with respect to the first lateral plane across the frame such that the vertical stack of case blanks is moved off the laterally spaced, moving means by the first and second plurality of laterally spaced pivotable slats and is moved to an attitude in which the case blanks are fed back onto the conveyor one by one so that they are shingled in the desired faced orientation;
means for collecting the oriented case blanks at the output end; the first plurality of pivotable slats being adjacent the input end of the conveyor and the second plurality of pivotable slats being adjacent the output end of the conveyor and both pluralities of pivotable slats being pivoted such that the faced orientation of the case blanks collected at the output end of the conveyor is the same as the faced orientation of the case blanks in the vertical stack of case blanks delivered to the input end of the conveyor; the stack being lifted and tilted towards the input end of the conveyor by the second plurality of slats, the first plurality of slats lowering the side of the stack onto the conveyor.

2. Apparatus for orienting case blanks comprising: a frame; a plurality of laterally spaced, longitudinal, moving means mounted in the frame to form a longitudinal conveyor having an input end and an output end; means for moving the plurality of laterally spaced, longitudinal, moving means; means for feeding a vertical stack of case blanks to the longitudinal conveyor at the input end; a first plurality of laterally spaced, pivotable slats mounted in the frame between the laterally spaced, longitudinal, moving means, the lengths of at least some of the first plurality of pivotable slats being greater than the height of the vertical stack of case blanks; a second plurality of laterally spaced, pivotable slats mounted in the frame between the laterally spaced, longitudinal, moving means, the lengths of at least some of the second plurality of pivotable slats being great enough to support the vertical stack of case blanks; first means for pivoting the first plurality of pivotable slats and second means for pivoting the second plurality of pivotable slats; both the pluralities of pivotable slats being pivoted with respect to a lateral line in a first lateral plane across the frame; means for sensing the position of the vertical stack of case blanks with respect to the first lateral plane; first means for actuating the first pivoting means and second means for actuating the second pivoting means actuated by the sensing means when one vertical end of the vertical stack of case blanks is at a predetermined position with respect to the first lateral plane across the frame such that the vertical stack of case blanks is moved off the laterally spaced, moving means by the first and second plurality of laterally spaced pivotable slats and is moved to an attitude in which the case blanks are fed back onto the conveyor one by one so that they are shingled in the desired faced orientation; means for collecting the oriented case blanks at the output end; the second plurality of pivotable slats being adjacent the input end of the conveyor and the first plurality of pivotable slats being adjacent the output end of the conveyor and both pluralities of pivotable slats being pivoted such that the faced orientation of the case blanks collected at the output end of the conveyor is the reverse of the faced orientation of the case blanks in the vertical stack of case blanks delivered to the input end of the conveyor; the stack being lifted and tilted by the second plurality of slats toward the output end of the conveyor, the first plurality of slats lowering the side of the stack onto the conveyor, the second plurality of slats pivoting from a position essentially coplanar with the conveyor through an angle greater than 90° so that the trailing edge of the top article of the stack becomes the leading edge of the shingled blanks.

3. The apparatus of claim 2 including:
a third plurality of laterally spaced, pivotable slats mounted in the frame between the laterally spaced, longitudinal, moving means, the lengths of at least some of the third plurality of pivotable slats being greater than the height of the vertical stack of case blanks;
a fourth plurality of laterally spaced, pivotable slats mounted in the frame between the laterally spaced, longitudinal, moving means, the lengths of at least some of the fourth plurality of pivotable slats being greater than the lengths of the case blanks;
third means for pivoting the third plurality of pivotable slats and fourth means for pivoting the fourth plurality of pivotable slats;
the third plurality of pivotable slats and the fourth plurality of pivotable slats being pivoted with respect to a second lateral line in a second lateral plane across the frame, the second lateral plane being intermediate the first lateral plane and the output end of the conveyor;
second means for sensing the position of the vertical stack of case blanks with respect to the second lateral plane;
the third plurality of pivotable slats being adjacent the input end of the conveyor and the fourth plurality of pivotable slats being adjacent the output end of the conveyor;
third means for actuating the third pivoting means and fourth means for actuating the fourth pivoting means actuated by the second sensing means when one vertical end of the vertical stack of case blanks is at a predetermined position with respect to the second lateral plane across the frame such that the vertical stack of case blanks is moved off the laterally spaced, moving means by the third and fourth plurality of laterally spaced pivotable slats and is moved to an attitude such that the faced orientation of the case blanks collected at the output end of the conveyor is the same as the faced orientation in the vertical stack of case blanks delivered to the input end of the conveyor;
means for selectively actuating the means for sensing the position of the vertical stack of case blanks with respect to the first lateral plane and the means for sensing the position of the vertical case blanks with respect to the second lateral plane.

4. The apparatus of claim 3 wherein:
the plurality of laterally spaced, longitudinal, moving means is a plurality of longitudinal belts.

5. The apparatus of claim 3 wherein:
the plurality of laterally spaced, longitudinal, moving means is a first plurality of belts; and including:
a second frame;
a second plurality of laterally spaced, longitudinal, movable, belts mounted in the second frame to form a second conveyor;
means for moving the second plurality of laterally spaced, longitudinal, movable, belts;
the second conveyor overlapping the conveyor such that the case blanks move from the conveyor to the second conveyor and from the second conveyor to the means for collecting the oriented case blanks at the output end;
the slope of the second conveyor being greater than the slope of the conveyor.

6. The apparatus of claim 2 wherein:
the plurality of laterally spaced, longitudinal, moving means is a plurality of longitudinal belts.

7. The apparatus of claim 1 wherein:
the plurality of laterally spaced, longitudinal, moving means is a plurality of longitudinal belts.

8. The apparatus of claim 1 wherein:
the plurality of laterally spaced, longitudinal, moving means is a first plurality of belts; and including:
a second frame;
a second plurality of laterally spaced, longitudinal, movable, belts mounted in the second frame to form a second conveyor;
means for moving the second plurality of laterally spaced, longitudinal, movable, belts;
the second conveyor overlapping the conveyor such that the case blanks move from the conveyor to the second conveyor and from the second conveyor to the means for collecting the oriented case blanks at the output end;
the slope of the second conveyor being greater than the slope of the conveyor.

9. The apparatus of claim 2 wherein:
the plurality of laterally spaced, longitudinal, moving means is a first plurality of belts; and including:
a second frame;
a second plurality of laterally spaced, longitudinal, movable, belts mounted in the second frame to form a second conveyor;
means for moving the second plurality of laterally spaced, longitudinal, movable belts;
the second conveyor overlapping the conveyor such that the case blanks move from the conveyor to the second conveyor and from the second conveyor to the means for collecting the oriented case blanks at the output end;
the slope of the second conveyor being greater than the slope of the conveyor.

References Cited

UNITED STATES PATENTS 2,829,759  4/1958  Parker.
3,262,697  7/1966  Krinke _____ 271—35 X
3,297,174  1/1967  Letchworth.

FOREIGN PATENTS 530,347  9/1956  Canada.
825,874  12/1959  Great Britain.

GERALD M. FORLENZA, *Primary Examiner.*

R. J. SPAR, *Assistant Examiner.*

U.S. Cl. X.R.

214—8.5, 1, 91